United States Patent
Boudebiza et al.

(10) Patent No.: US 10,557,415 B2
(45) Date of Patent: Feb. 11, 2020

(54) TURBO-ENGINE INCLUDING TWO SEPARATE VENTILATION FLOWS

(71) Applicant: SAFRAN AIRCRAFT ENGINES, Paris (FR)

(72) Inventors: Tewfik Boudebiza, Paris (FR); Gilles Alain Charier, La Grande Paroisse (FR); Augustin Marc Michel Curlier, Boissise la Bertrand (FR); Jean-Christophe Duffet, Saint-Mande (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 436 days.

(21) Appl. No.: 15/088,525

(22) Filed: Apr. 1, 2016

(65) Prior Publication Data

US 2016/0290236 A1    Oct. 6, 2016

(30) Foreign Application Priority Data

Apr. 3, 2015   (FR) ..................... 15 52900

(51) Int. Cl.
*F01D 9/06* (2006.01)
*F02C 3/067* (2006.01)
(Continued)

(52) U.S. Cl.
CPC ............. *F02C 7/18* (2013.01); *F01D 25/24* (2013.01); *F02C 3/067* (2013.01); *F02C 3/10* (2013.01);
(Continued)

(58) Field of Classification Search
CPC .......... F02C 3/067; F02K 3/062; F02K 3/072; F01D 1/24; F01D 9/065; F01D 25/24; F05D 2220/324
See application file for complete search history.

(56) References Cited

U.S. PATENT DOCUMENTS 4,979,872 A * 12/1990 Myers ..................... F01D 9/065
                                                          403/131
5,154,578 A   10/1992 Miraucourt et al.
(Continued)

FOREIGN PATENT DOCUMENTS

GB              873969       8/1961
WO     WO 2014/092750 A1    6/2014

OTHER PUBLICATIONS

U.S. Appl. No. 14/164,827, filed Jan. 27, 2014, 2015/0047369 A1, Nadege Hugon, et al.
(Continued)

*Primary Examiner* — William H Rodriguez
(74) *Attorney, Agent, or Firm* — Oblon, McClelland, Maier & Neustadt, L.L.P.

(57) ABSTRACT

A non-faired propeller turbo-engine includes a gas generator and a propulsion unit that is separated from the gas generator by an intermediate housing. The turbo-engine includes a housing and a radially internal ferrule that are coaxial and are connected by hollow radial arms. The housing of the turbo-engine also defines, in part, a gas flow duct of a secondary gas flow. Each radial arm is hollow and is traversed by at least one service of the turbo-engine. Additionally, at least one arm is traversed by a ventilation gas circulation duct from the secondary gas flow and which leads to at least one component from among a power turbine and a mechanical transmission of said propulsion unit.

12 Claims, 4 Drawing Sheets

(51) Int. Cl.
- *F02K 3/062* (2006.01)
- *F02C 7/18* (2006.01)
- *F01D 25/24* (2006.01)
- *F02C 3/10* (2006.01)
- *F02K 3/072* (2006.01)

(52) U.S. Cl.
CPC .......... *F02K 3/072* (2013.01); *F05D 2220/32* (2013.01); *F05D 2260/20* (2013.01)

(56) References Cited

U.S. PATENT DOCUMENTS

| | | | | |
|---|---|---|---|---|
| 5,292,227 | A * | 3/1994 | Czachor | F01D 25/162 415/142 |
| 5,482,431 | A * | 1/1996 | Taylor | F01D 9/065 415/111 |
| 6,217,279 | B1 * | 4/2001 | Ai | F01D 9/065 415/110 |
| 6,358,001 | B1 * | 3/2002 | Bosel | F01D 25/162 411/178 |
| 6,439,841 | B1 * | 8/2002 | Bosel | F01D 9/065 415/142 |
| 6,546,735 | B1 * | 4/2003 | Moniz | F01D 9/065 415/118 |
| 8,876,462 | B2 | 11/2014 | Balk et al. | |
| 8,967,950 | B2 | 3/2015 | Charier et al. | |
| 9,057,326 | B2 | 6/2015 | Charier et al. | |
| 9,227,723 | B2 | 1/2016 | Balk et al. | |
| 9,847,629 | B2 * | 12/2017 | Moisei | H02G 3/0481 |
| 9,869,248 | B2 * | 1/2018 | Suciu | F02C 6/02 |
| 2004/0168443 | A1 * | 9/2004 | Moniz | F01D 9/065 60/796 |
| 2005/0247042 | A1 * | 11/2005 | Fert | F01D 9/065 60/226.1 |
| 2005/0247043 | A1 * | 11/2005 | Derenes | F01D 9/065 60/226.1 |
| 2006/0123796 | A1 * | 6/2006 | Aycock | F01D 9/065 60/782 |
| 2010/0236215 | A1 * | 9/2010 | Venkataramani | F02D 9/065 60/39.093 |
| 2010/0275572 | A1 * | 11/2010 | Durocher | F01D 9/065 60/39.08 |
| 2011/0209458 | A1 | 9/2011 | Negulescu | |
| 2012/0079808 | A1 | 4/2012 | Glynn et al. | |
| 2013/0028718 | A1 * | 1/2013 | Strom | F01D 9/065 415/182.1 |
| 2014/0003920 | A1 * | 1/2014 | Scott | F01D 9/065 415/177 |
| 2017/0138264 | A1 * | 5/2017 | Tham | F02C 7/18 |

OTHER PUBLICATIONS

U.S. Appl. No. 14/474,463, filed Sep. 2, 2014, 23015/0308280 A1, Jean-Christophe Duffet, et al.
U.S. Appl. No. 14/414,343, filed Feb. 12, 2015, 2015/0219014 A1, Olivier Belmonte, et al.
U.S. Appl. No. 14/922,647.
French Preliminary Search Report dated Feb. 10, 2016 in French Application 15 52900 filed on Apr. 3, 2015 (with English Translation of Categories of Cited Documents).

* cited by examiner

TURBO-ENGINE INCLUDING TWO SEPARATE VENTILATION FLOWS

FIELD OF THE INVENTION

The invention relates to a non-faired propeller turbo-engine, and more particularly a contra-rotating propeller turbo-engine commonly referred to as "open-rotor".

The invention relates more particularly to a turbo-engine, comprising enhanced means for cooling the propulsion assembly driving the contra-rotating propellers.

STATE OF THE RELATED ART

A non-faired propeller turbo-engine, also referred to as "open-rotor", essentially comprises a dual-body gas generator and a propulsion unit having two contra-rotating propeller disks driven by the gases outflowing from the gas generator.

The gas generator conventionally includes, from upstream to downstream, a low-pressure compressor, a high-pressure compressor, a combustion chamber, a high-pressure turbine and a low-pressure turbine.

The propulsion unit includes a power turbine, a mechanical transmission device acting as a reduction gear rotating the propeller disks in opposite directions.

The various components of the turbo-engine are housed in various consecutive housings. Furthermore, an intermediate housing provides the link between the gas generator and the propulsion unit.

This intermediate housing essentially comprises two coaxial ferrules interconnected by a plurality of radial arms and defining an annular gas flow jet. The gas flow circulating through this flow jet is referred to as the primary gas flow.

The arms are hollow and are generally used to enable the passage of various services of the gas generator via the gas flow jet.

The propulsion unit turbine receives the primary gas flow circulating in the flow jet. This turbine, along with the mechanical transmission of the propulsion unit, are conduced to overheat, the turbo-engine consequently must include means for cooling the turbine and the mechanical transmission.

The ventilation of components is generally carried out by extracting air from a secondary gas flow circulating around the primary gas flow. However, as the primary gas flow is situated between these elements and an external secondary gas flow, conveying a sufficient ventilation air flow to these components is consequently difficult to implement.

The aim of the invention is that of proposing an "open rotor" type turbo-engine comprising sufficient means for the ventilation of components of the turbine and the mechanical transmission of the propulsion unit.

DESCRIPTION OF THE INVENTION

The invention relates to a non-faired propeller turbo-engine comprising a gas generator and a contra-rotating propeller propulsion unit which is separated from the gas generator by an intermediate housing, the turbo-engine including a housing and a radially internal ferrule which are coaxial, which define a gas flow duct of a primary gas flow and which are connected by hollow radial arms, said housing also defining in part a gas flow duct of a secondary gas flow, wherein each radial arm is hollow and is traversed by at least one service of the turbo-engine, characterised in that at least one arm is traversed by a ventilation gas circulation duct from the secondary gas flow and which leads to at least one component from among in particular a power turbine and a mechanical transmission of said propulsion unit.

Adding an additional duct enables the circulation of the ventilation air flow through the arm, without this ventilation air mixing in the surrounding volume. This additional air flow can thus be channeled towards the propulsion unit turbine without loss.

Preferably, a radially external end of the duct leads to the gas flow duct of the secondary flow and the radially internal end of the duct leads to at least one distribution box of the ventilation gas flow.

Preferably, at least one of the two radial ends of the duct is oriented essentially radially with respect to the main axis of the turbo-engine.

Preferably, the turbo-engine includes means for connecting each radial end of the duct to the ferrule or to the associated housing enabling movement of said radial end of the duct with respect to the ferrule or with respect to the associated housing along the main axis of said radial end of the duct.

Preferably, each of the housing and the internal ferrule includes a stop ring situated radially facing and at a distance from the radial end of the duct which is associated with said ferrule or the housing, and against which ring the radial end of the duct is suitable for coming into abutment radially.

Preferably, the turbo-engine includes a plurality of injectors of ventilation gas towards said component of the propulsion unit and channeling means extending from said at least one distribution box to the injectors.

Preferably, said distribution box forms an annular element wherein each duct leads.

Preferably, the turbo-engine includes a plurality of distribution boxes distributed about the main axis of the turbo-engine, and into each whereof at least one duct leads.

Preferably, each arm includes a structural arm connecting the ferrule and the housing with one another, which is traversed radially by at least one service associated with the gas generator and a double skin at least partially covering the structural arm, which defines a volume situated downstream from the structural arm and through which at least the duct is arranged.

Preferably, said double skin has an aerodynamic cross-section.

BRIEF DESCRIPTION OF THE FIGURES

Further features and advantages of the invention will emerge on reading the following detailed description for the comprehension whereof reference will be made to the appended figures wherein.

DETAILED DESCRIPTION OF PARTICULAR EMBODIMENTS

Figure 1:
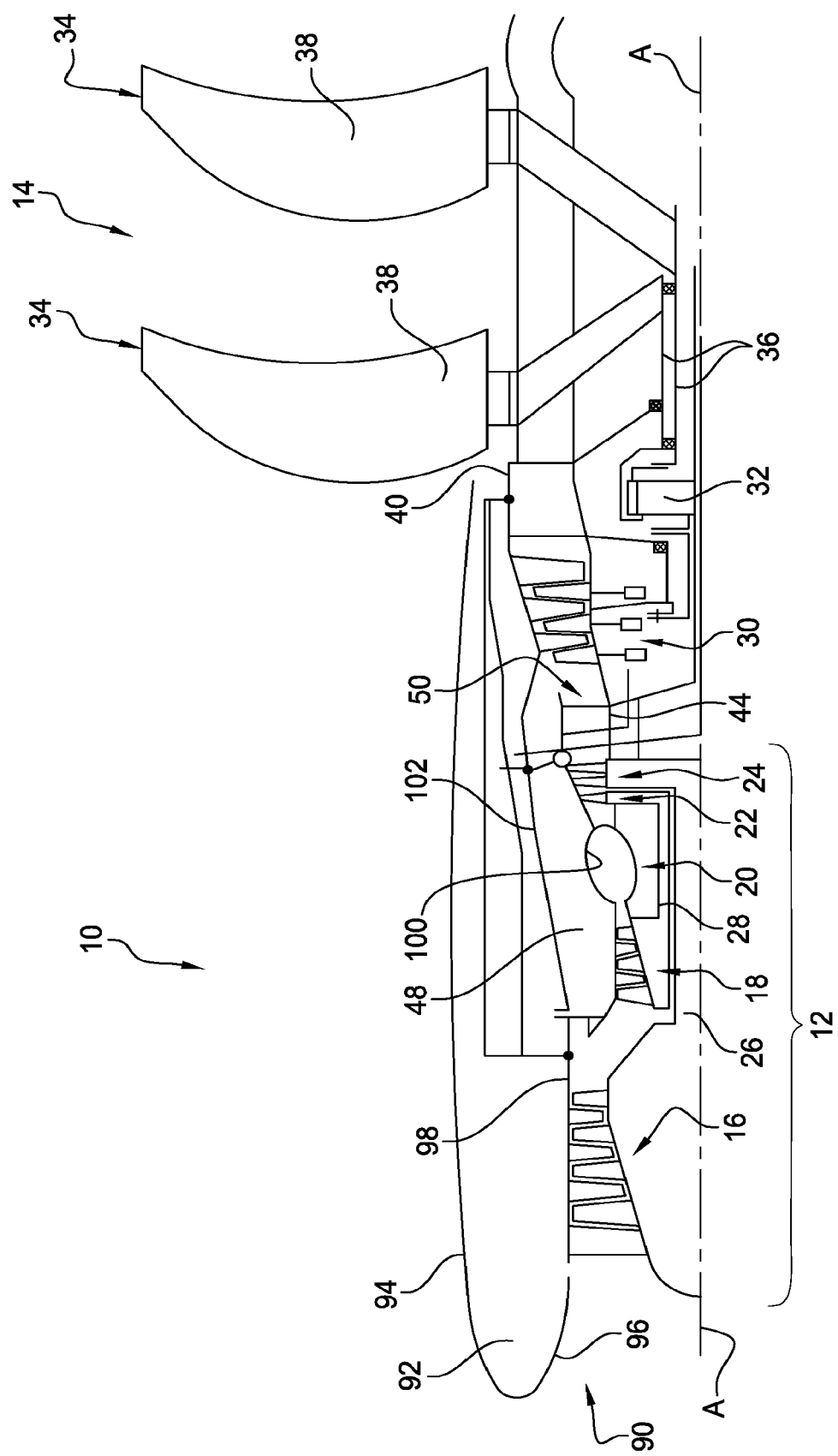
FIG. 1 is a schematic axial cross-section representation of an "open rotor" type turbo-engine.

FIG. 1 represents a non-faired propeller turbo-engine 10, commonly referred to as "open rotor".

The turbo-engine 10 includes a gas generator 12 arranged in the front part of the turbo-engine 10 and a propulsion unit 14 arranged in the rear part of the turbo-engine 10.

The gas generator 12 is of the dual-body type, and includes, from upstream to downstream, a low-pressure compressor 16, a high-pressure compressor 18, a combustion chamber 20, a high-pressure turbine 22 and a low-pressure turbine 24. The low-pressure compressor 16 and the low-pressure turbine 24 are mechanically connected by a low-pressure shaft 26, thus forming a low-pressure body, the high-pressure compressor 18 and the high-pressure turbine 22 are mechanically connected by a high-pressure shaft 28, thus forming a high-pressure body.

The propulsion unit 14 is arranged downstream from the low-pressure turbine 24, and it receives the gas flow produced by the gas generator 12, converting the energy from this flow into propulsion energy.

The propulsion unit 14 includes a power turbine 30 driven by the gas flow produced by the gas generator 12, a mechanical transmission 32 driven by the power turbine 30 and two contra-rotating propellers 34 connected to the mechanical transmission 32.

The functions of the mechanical transmission 32 are those of reducing the rotational speed of each propeller 34 with respect to the rotational speed of the power turbine 30 and of rotating two coaxial shafts 36 in opposite directions.

Each shaft 36 bears a propeller 34 consisting of a plurality of blades 38 distributed circumferentially about the main axis A of the turbo-engine 10. As the shafts 36 are rotated in opposite directions of rotation, the pitch of one propeller 34 is inverted with respect to the pitch of the other propeller 34.

The propellers 34 are furthermore axially offset with respect to one another.

The gas generator 12 and the propulsion unit 14 are connected by a static frame housing 40.

At the front part, the turbo-engine 10 has an air inlet 90 extended to the rear by a nacelle 92, including generally an outer skin 94 and an inner skin 96, both centred on the axis A and radially spaced from one another.

The inner skin 96 forms an external radial housing for the gas generator 12, it is extended by an intermediate housing 98 separating the compressors 16 and 10.

The high-pressure compressor 18, the combustion chamber 20 and the turbines 22 and 24 are surrounded by a gas generator housing 100 the upstream end whereof is connected to the intermediate housing 98.

The turbo-engine 10 is further equipped with a reinforcing jacket 102 extending in a centred manner about the main axis A of the turbo-engine 10 between the intermediate housing 98 and the static frame housing 40.

The reinforcing jacket 102 and the gas generator housing 100 define an air flow duct 48. The air circulating in this flow duct 48 can be extracted at a bypass provided in the intermediate housing 98. This cold air then makes it possible to cool the hot parts of the gas generator 14 situated below the housing 100.

Figure 2:
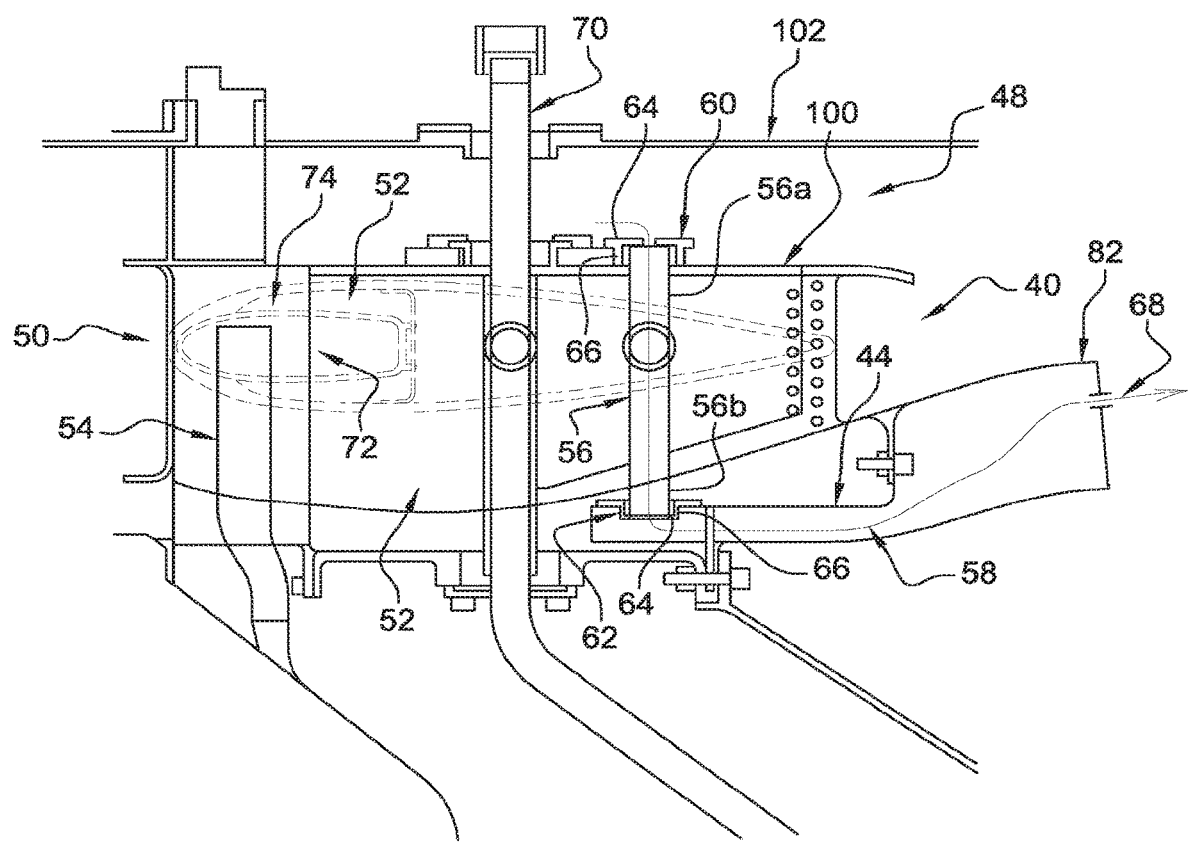
FIG. 2 is a detailed drawing on a larger scale of a part of the turbo-engine represent in FIG. 1, showing a cross-section of an arm traversed by the ducts.

As can be seen in more detail in FIG. 2, the turbo-engine includes radial arms 50 distributed about the main axis A of the turbo-engine 10 extending radially between the gas generator housing 100 and an internal ferrule 44 defining, with the housing 100, a primary gas flow duct.

Each radial arm 50 is hollow, it defines a main radial orientation recess 52 extending along the entire radial length of the arm 50.

The recess 52 defined by each arm 50 places the secondary gas flow duct 48 in communication with elements of the gas generator, notably the low-pressure turbine 24, for the ventilation thereof, so as to facilitate the cooling of the low-pressure turbine 24.

Each hollow arm 50 further makes it possible to allow the transit of various lines, or services 54 of the turbo-engine, through the primary gas flow duct, protecting these services 54 from the primary gas flow, which is at a high temperature.

The services 54 generally consist of ducts for circulating lubricant or actuating components, or electrical power supply cables or cables for controlling other components of the turbo-engine 10.

The power turbine 30 is thus supplied with lubricant and coolant via one of these services 54.

In operation, the power turbine 30 is conduced to overheat considerably. The lubricant flow supplying same is sometimes insufficient to enable the complete cooling thereof.

For this reason, the turbo-engine 10 further comprises a ventilation circuit of the propulsion unit 12, which extracts a portion of the secondary gas flow, for injection towards the power turbine 30 and also towards the mechanical transmission 32.

The ventilation gas flow passes through the primary gas flow duct and it must be separated from the ventilation gas flow which is directed towards components of the gas generator 12, such as the low-pressure turbine 24.

The means for ventilating the power turbine 30 include at least one ventilation gas circulation duct 56 which has a main radial orientation with respect to the main axis A of the turbo-engine 10, and which is arranged in the internal volume 52 of an arm 50.

According to one preferred but not limiting embodiment, the means for ventilating the power turbine 30 include a duct 56 arranged in each of the arms 50 of the intermediate housing 40.

According to one alternative embodiment, the means for ventilating the power turbine 30 include ducts 56 arranged in some of the arms 50 of the intermediate housing 40.

In the description hereinafter, reference will be made to a single duct 56. It will be understood that this description of the single duct applies in an identical or similar manner to the other ducts 56 of the means for ventilating the power turbine 30.

As can be seen in FIG. 2, the duct 56 extends radially on either side of the associated arm 50, i.e. each of the ends 56a, 56b thereof protrudes radially with respect to the ends of the arm 50.

The radially external end 56a of the duct 56 projects radially outwards with respect to the radially external end of the arm 50, it is consequently situated inside the secondary gas flow duct 48. At this end 56a of the duct 56, the ventilation gas flow supplies the duct 56.

The external end 56a of the duct 56 is connected to means (not shown) for extracting a portion of the secondary gas flow. By way of non-limiting example, these extraction means consist of a scoop connected to the external end 56a of the duct 56.

The radially internal end 56b of the duct 56 projects radially inwards with respect to the radially internal end of the arm 50. It leads to a distribution box 58 of the ventilation gas flow which is adjoined to the internal ferrule 44 of the intermediate housing 40.

During the operation of the turbo-engine 10, the various components expand according to different amplitudes. In particular, the radial length of the duct 56 is conduced to vary with respect to the radial length of the associated arm 50.

This results in the radial position of the ends 56a, 56b of the duct 56 moving radially with respect to the radial ends of the arm 50 and thus with respect to the gas generator housing 100 and the internal ferrule 44.

To enable such a radial movement of the ends 56a, 56b of the duct 56 with respect to the gas generator housing 100 and the internal ferrule 44, the gas generator housing 100 bears a radial stop ring 60 which is offset radially outwards with respect to the gas generator housing 100 and with respect to the associated external radial end 56a of the duct 56 and the internal ferrule 44 bears a radial stop ring 62 which is offset radially inwards with respect to the internal ferrule 44 and with respect to the internal radial end 56b of the duct 56.

The radial distance between the two stop rings 60, 62 is greater than the radial length of the duct 56 and, preferably, greater than the maximum radial length of the duct 56, i.e. when the expansion of the duct 56 is maximum.

The stop rings 60, 62 (means for securing) thus carry out radial securing of the duct 56 with respect to the intermediate housing 40, while enabling different expansions of the intermediate housing 40 and the duct 56.

Each stop ring 60, 62 includes a plane annular part 64 which is perpendicular to the main axis of the duct 56 and which includes a central orifice for ventilation gas flow. The annular part 64 is attached and is maintained radially at a distance from the gas generator housing 100 or the internal ferrule 44 associated therewith by an annular sleeve 66 coaxial with the main axis of the duct 56. The sleeve 66 is thus situated radially between the plane annular part 64 and the gas generator housing 100 or the internal ferrule 44 associated therewith.

According to the embodiment shown in FIG. 2, the internal radial end 56b of the duct 56 is oriented essentially radially and leads radially to the distribution box 8.

Figure 3:
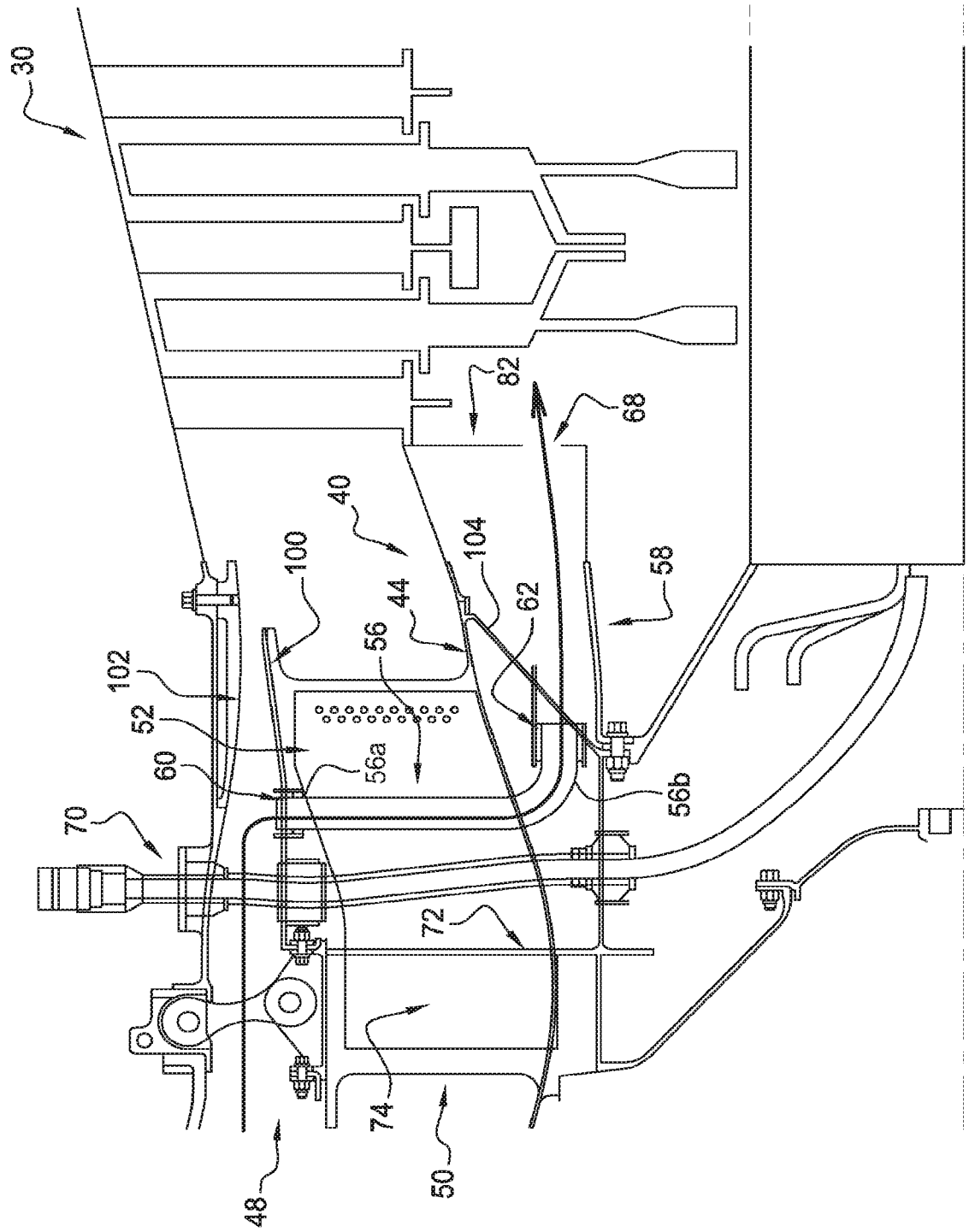
FIG. 3 is a similar view to that of FIG. 2, showing an alternative embodiment.

FIG. 3 represents an alternative embodiment of the duct 56, whereby the internal radial end 56b thereof is oriented parallel with the main axis A of the turbo-engine 10.

The internal radial end 56b of the duct 56 leads to the distribution box 58 in an axial direction, thus promoting the circulation of the ventilation gas flow to the power turbine 30.

The distribution box 58 includes for this purpose an upstream wall 104 wherein the duct 56 leads.

According to this embodiment, the stop ring 62, which is associated with this internal radial end 56b of the duct 56, enables the duct 56 to be deformed axially with respect to the upstream wall 104 of the stop box 82 and it carries out radial positioning of the duct 56 in the radial arm 50.

The stop ring 60 which is associated with the external radial end 56a of the duct 56 enables the duct 56 to be deformed radially with respect to the housing 100 and it carries out axial positioning of the duct 56 in the radial arm 50.

The distribution box 58 is defined in part by the internal ferrule 44 and it is extended axially along the axis A of the turbo-engine 10 by means 82 for channeling the gas flow to ventilation gas injectors 68. By way of example, the injectors 68 consist of orifices formed in a wall of the distribution box 58.

According to a further embodiment, the injectors 68 are included directly in the distribution box 58.

By means of such an embodiment and direct connection of the injectors 68 with the distribution box 58, the ventilation circuit of the propulsion unit 12 is enclosed from the means for extracting a portion of the secondary gas flow to the injectors.

Therefore, no ventilation air leakage or drop in pressure of the ventilation gas flow can occur, up to the component to be cooled.

According to one preferred embodiment, the distribution box 58 extends over the entire periphery of the internal ferrule 44, i.e. it defines an annular distribution volume wherein all the ducts 56 lead.

According to one alternative embodiment, the ventilation means include a plurality of distribution boxes 58 distributed about the main axis A of the turbo-engine 10, and into each whereof a duct 56 or plurality of adjacent ducts 56 lead.

Each radial arm 50 is designed to enable the passage of the services 54 towards components of the gas generator 12, such as the arm according to the prior art, and also for the passage of services 70 of the propulsion unit 14 and the ducts 56, in particular.

Consequently, each arm 50 is designed to be traversed by a large number of components. The diameter of each duct 56 is generally large, to limit head losses and ensure a satisfactory ventilation gas supply.

Furthermore, the arms 50 also provide the link between the gas generator housing 100 and the internal ferrule 44, for supporting some components of the gas generator 12.

Figure 4:
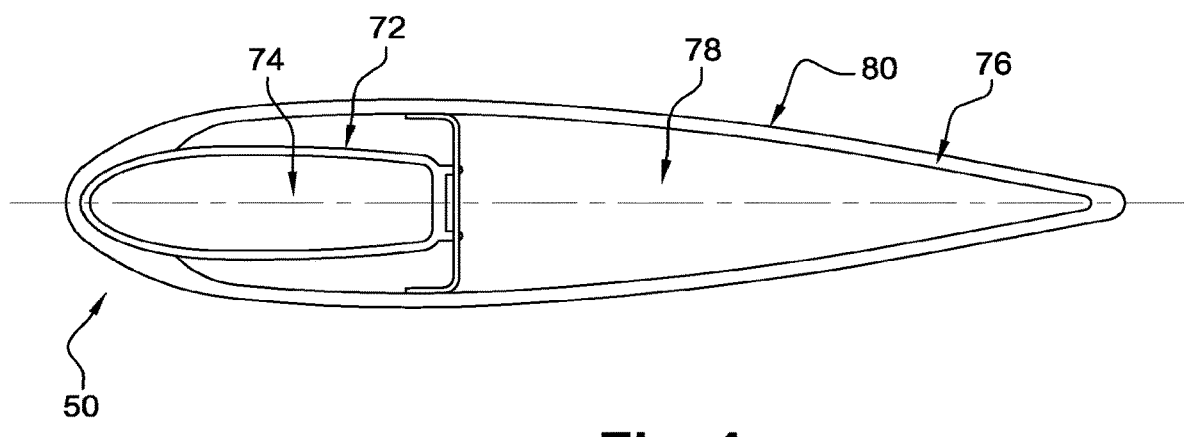
FIG. 4 is a cross-section of the radial arm represented in FIG. 2.

As can be seen in FIG. 4, each arm 50 includes a part acting as a structural arm 72, which provides the mechanical link between the gas generator housing 100 and the internal ferrule 44 and which withstands the various stress generated in the intermediate housing 40.

This structural arm 72 is hollow and it defines a radial duct 74 traversed by the services 54 intended for the gas generator 12.

The arm 50 also includes a double skin 76 surrounding a downstream part of the structural arm 72 and extending the structural arm downstream. The shape of the double skin 76 completes that of the structural arm to give the arm 50 an aerodynamic profile offering a lower resistance to the primary gas flow.

The double skin 76 defines a radial duct 78 situated downstream from the structural arm 72, which is parallel with a radial duct 74 defined by the structural arm 72.

Preferably, the cross-section of this radial duct 78 defined by the double skin 76 is greater than the cross-section of the radial duct 74 defined by the structural arm 72. This double skin 76 thus makes it possible to enable the passage of elements of greater cross-section.

As such, preferably, the duct 56 and the services 70 intended for the propulsion unit 14 pass through the radial duct 78 defined by the double skin 76.

As a result of this structure of the arm 50, the recess 52 defined thereby consists of the radial duct 74 defined by the structural arm 72 and the radial duct 78 defined by the double skin 76.

The arm 50, i.e. the structural arm 72 and the double skin 76, is surrounded by filleting, commonly referred to as "fairing" 80, the cross-section whereof has an aerodynamic shape.

The invention claimed is:

1. A turbo-engine with non-faired propellers comprising:
   a gas generator;
   a propulsion unit which is separated from the gas generator by an intermediate housing; and
   a housing and a radially internal ferrule which are coaxial and define a gas flow duct of a primary gas flow, and which are connected by hollow radial arms, said housing also defining in part a gas flow duct of a secondary gas flow, wherein each of the hollow radial arms is hollow and is traversed by at least one service duct of the turbo-engine, and wherein at least one of the hollow radial arms is traversed by a ventilation gas circulation duct from the secondary gas flow and which leads to at least one component from among a power turbine and a mechanical transmission of said propulsion unit.

2. The turbo-engine according to claim 1, wherein a radially internal end of the ventilation gas circulation duct leads to at least one distribution box.

3. The turbo-engine according to claim 2, further comprising a plurality of injectors of ventilation gas towards said component of the propulsion unit which are connected to the distribution box.

4. The turbo-engine according to claim 3, wherein the injectors are included directly in the distribution box.

5. The turbo-engine according to claim 2, wherein said distribution box forms an annular element wherein each ventilation gas circulation duct leads.

6. The turbo-engine according to claim 2, wherein the turbo-engine includes a plurality of distribution boxes distributed about the main axis (A) of the turbo-engine, and at least one ventilation gas circulation duct leads into each of the plurality of distribution boxes.

7. The turbo-engine according to claim 6, wherein a radially external end of the ventilation gas circulation duct leads to a flow jet of the secondary gas flow and the radially internal end of the ventilation gas circulation duct leads to at least one distribution box of the ventilation gas flow.

8. The turbo-engine according to claim 7, wherein at least one of the two radial ends of the ventilation gas circulation duct is oriented essentially radially with respect to the main axis A of the turbo-engine.

9. The turbo-engine according to claim 7, further comprising means for securing each radial end of the ventilation gas circulation duct to the ferrule or to the associated housing enabling movement of said radial end of the ventilation gas circulation duct with respect to the ferrule or with respect to the associated housing along the main axis of said radial end of the ventilation gas circulation duct.

10. The turbo-engine according to claim 9, wherein each of the housing and the internal ferrule includes a stop ring situated radially facing and at a distance from the radial end of the ventilation gas circulation duct which is associated with said ferrule or the housing, and against which ring, the radial end of the ventilation gas circulation duct is suitable for coming into abutment radially.

11. The turbo-engine according to claim 1, wherein each of the hollow radial arms includes a structural arm connecting the ferrule and the housing with one another, which is traversed radially by the at least one service duct associated with the gas generator and a double skin at least partially covering the structural arm, which defines a volume situated downstream from the structural arm and through which at least the ventilation gas circulation duct is arranged.

12. The turbo-engine according to claim 11, wherein said double skin has an aerodynamic cross-section.

* * * * *